United States Patent

[11] 3,578,054

[72] Inventor Jacques Boileau
 Clermont-Ferrand, France
[21] Appl. No. 702,564
[22] Filed Feb. 2, 1968
[45] Patented May 11, 1971
[73] Assignee Compagnie Generale Des Etablissements
 Michelin, raison sociale Michelin & Cie
 Clermont-Ferrand(Puy-de-Dome), France
[32] Priority Feb. 6, 1967
[33] France
[31] 93886

[54] TIRE COVERS
 4 Claims, 6 Drawing Figs.
[52] U.S. Cl.................................................. 152/330,
 152/361
[51] Int. Cl...................................................... B60c 19/00
[50] Field of Search........................................... 152/330,
 352, 353, 354, 356, 361

[56] References Cited
 UNITED STATES PATENTS
 3,195,602 7/1965 Keefe............................ 152/361

| | | | |
|---|---|---|---|
| 3,231,000 | 1/1966 | Massoubre.................. | 152/361 |
| 3,339,610 | 9/1967 | Fausti........................... | 152/354 |

FOREIGN PATENTS

| | | | |
|---|---|---|---|
| 1,448,109 | 6/1966 | France......................... | 152/361 |
| 484,176 | 9/1935 | Great Britain............... | 152/209 |

*Primary Examiner*—James B. Marbert
*Attorney*—Brumbaugh, Graves, Donohue & Raymond ABSTRACT: A series of tires for an automotive vehicle is manufactured in accordance with an identical model, on identical machines and under identical conditions. Because of manufacturing tolerances, the tires have a pseudocamber the magnitude of which is an aleatory variable. The pseudocamber is measured for each tire, and those tires having a pseudocamber producing a lateral thrust, when the tires roll at 10 km./h at normal load and pressure on level ground, beyond 0 percent to 6 percent and, preferably, 1 percent to 4 percent of the rated load of tire, are rejected. The remaining tires are marked by any arbitrary symbols the meaning of which is understood by users, to indicate the direction of mounting on a rim. The tires are mounted on their respective rims so that the lateral thrust is outward on the front wheels and inward on the rear wheels.

INVENTOR.
JACQUES BOILEAU
BY
Brumbaugh, Free, Graves & Donohue
his ATTORNEYS 3,578,054

TIRE COVERS

BACKGROUND OF THE INVENTION

This invention relates to improvements in tire casings, especially tire casings of the radial-carcass type, and methods of manufacturing and using such casings.

It has been found that all tire casings show to a varying degree—and radial-carcass-type tires to a larger degree—a characteristic which manifests itself in an effect similar to the effect produced by a camber angle given to a wheel fitted with a tire. A wheel is said to have a camber if its axis, and consequently the axis of the tire mounted on it, is inclined in relation to a horizontal plane on which the tire rolls. A camber angle of the wheel produces a lateral thrust. Tires, even when mounted on wheels with a zero camber angle, are subject to a lateral thrust, as if the wheel had a camber angle, and this property, due to deviations of the manufacturing conditions, will hereinafter be referred to as "pseudocamber." Pseudocamber of tires, which is independent of the camber of wheels, is especially observed under the following conditions.

If an axle is provided on one side with a tire the pseudocamber of which is zero and on the other side with a tire of the same model the pseudocamber of which has any value whatever, it will be found that, in general, the axle when translated has a tendency to deviate to one side, for example, to the right. If one reverses the two wheels without taking off the tires, the axle will have a tendency to deviate in the other direction, i.e., towards the left in this example. Of course, an axle equipped with two neutral tires, i.e., tires the pseudocambers of which by coincidence are zero or very small, is displaced in a straight line without deviation to the right or the left. Likewise, an axle provided with two tires of the same model having pseudocambers appreciably different from zero deviates in general to one or the other side, unless the pseudocambers of the two tires have substantially equal values and the tires are mounted in a manner whereby one of them has a tendency to cause the axle to deviate to the right and the other one has a tendency to cause the axle to deviate to the left. In other words, the pseudocamber is experienced during driving as either an inward or an outward thrust exerted by the tire on the wheel and axle. This thrust is a measure of the pseudocamber in magnitude and in direction.

Pseudocamber has long been regarded as detrimental and as a phenomenon to be eliminated to the extent possible by selection of proper structures of the tire or of proper manufacturing conditions.

SUMMARY OF THE INVENTION

An object of the present invention is to take advantage of pseudocamber and, in particular, to utilize pseudocamber to improve the handling characteristics of automotive vehicles. Another object of the invention is to render commercially desirable tires that in accordance with present practice are commercially undesirable, thereby achieving substantial manufacturing economies.

The foregoing and other objects of the invention are attained by the provision of tire casings having a pseudocamber which, during rolling at 10 km./h at normal load and pressure and on level ground, give rise to a force on the spindle or axle bearing the tires within the range of from 0 percent to 6 percent, and preferably from 1 percent to 4 percent, of the rated load of the tire. In accordance with the invention, the direction of mounting of the tire on the rim is different for the front and the rear wheels, is indicated on the tire, and depends upon the direction and, in some applications, the magnitude of the pseudocamber of the tire.

The method of making use of the tires in accordance with the invention consists in mounting the tires on their respective rims in such a manner that their respective pseudocambers produce forces directed towards the outside of the vehicle on which the tires are mounted on the front axles or spindles and forces directed towards the inside of the vehicle on the rear axles or spindles.

In accordance with an embodiment in the exceptional case in which it is desired to increase the response of the vehicle to the action of the steering wheel, one may mount the tires in such a manner as to have the inward thrust on the front spindles and the outward thrust in the rear.

The method of manufacture of tires in accordance with the invention consists in (a) manufacturing a series of tires in accordance with an identical model on identical machines and in identical conditions so that the direction and/or the magnitude of the pseudocamber become aleatory variables, (b) measuring for each of the tires the direction and the magnitude of the pseudocamber, (c) eliminating the tires with a pseudocamber that is too much different from the desired value, (d) marking on the others, by means of any suitable symbols the meaning of which is known to the users, the direction and possibly the magnitude of the pseudocamber and/or the position of mounting on the rim.

BRIEF DESCRIPTION OF THE DRAWING

An understanding of additional aspects of the invention may be gained from a consideration of the following detailed description of representative embodiments thereof, taken in conjunction with the accompanying FIGS. of the drawing, in which.

DESCRIPTION OF THE PREFERRED EMBODIMENTS

Figure 1:
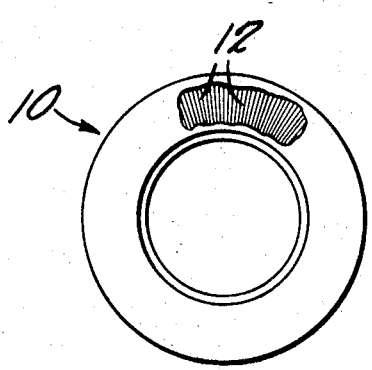
FIG. 1 is an elevational view, partly broken away, of a radial-carcass-type tire, to which the principles of the present invention are particularly applicable.

FIG. 1 shows a tire 10 of the radial-carcass type. The tire 10 has reinforcements 12 in the carcass thereof extending radially from bead to bead.

Regardless of the efforts made to manufacture tires uniformly, there remain small accidental differences resulting from manufacturing tolerances. Two tires of a series are therefore identical only in exceptional cases. One manifestation of these individual variations is the pseudocamber of the tires. For a series of tires of the same model, of a classical type manufactured under given identical conditions, the pseudocambers range at random around a mean value which is generally zero, half of the series having a pseudocamber in one direction and the other half having a pseudocamber in the other direction. In the case of tires of the radial type, the standard deviation of the magnitude of the pseudocamber thrust is normally greater than in the case of tires having crossed plies. The invention is therefore particularly applicable to tires having casings of the radial type.

Figure 2:
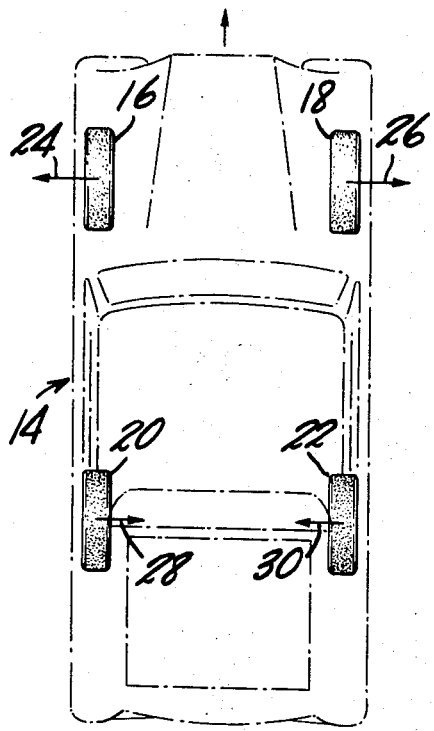
FIG. 2 is a schematic plan view of an automotive vehicle showing the mounting of tires thereon in accordance with the invention.

While variations in pseudocamber can be reduced by the establishment of narrow manufacturing tolerances, their elimination is not a commercially acceptable proposition in the case of radial-type tires. In accordance with the invention, advantage is taken of pseudocamber by mounting the tires in a prescribed manner. Specifically, the tires are mounted so that an outward lateral thrust is developed on the front wheels of the automotive vehicle and an inward lateral thrust is developed on the rear wheels of the vehicle. FIG. 2 shows an automotive vehicle 14 having front tires 16 and 18 and rear tires 20 and 22. The pseudocamber of the front tires 16 and 18 is such as to produce on the front wheels of the automotive vehicle laterally outwardly-directed forces as indicated by arrows 24 and 26, respectively. The pseudocamber of the rear tires 20 and 22 is such as to develop on the rear wheels laterally inwardly directed forces, as indicated by arrows 28 and 30, respectively.

It might be supposed that, for the progress of the vehicle in a straight line, without deflection of the front wheels, it does not make any difference in which manner the tires are mounted, so long as the pseudocambers of the tires on each axle are in opposition. In fact, however, it has been found that this supposition is valid only in the case of driving on perfectly level ground and in the absence of any outside interference. Such ideal conditions are seldom attained. Among all the possible combinations, the best is that which utilizes the pseudocamber of the tires in order to pull outwardly on the front wheels and push inwardly on the rear wheels. This combination assures much better than the others a straight line path, for it is self-correcting and depends only on the direction and magnitude of the pseudocamber and not on the manner in which it is obtained.

This optimum combination in accordance with the invention is superior in particular to the combination, usually suggested to users, in accordance with which the four tires are mounted in an identical manner; i.e., so that they exert on their respective wheels either an outward pull or an inward push. In certain exceptional cases, however, a combination which is the reverse of the optimum combination, i.e., a combination which makes use of the pseudocamber of the tires in order to push inwardly on the front wheels and pull outwardly on the rear wheels, may be of interest, inasmuch as it increases the response of the vehicle to the action of the steering wheel, thereby remedying any excess stability which the vehicle might otherwise have.

In accordance with the invention, a pseudocamber other than zero may be systematically provided for by the deliberate introduction of an asymmetry with respect to the equatorial plane of the tire. Thus, a slight conicity of the tread or the reinforcing plies may be provided, or the plies may be axially offset with respect to the tread.

In order for the user or the car manufacturer to mount the tires properly, the direction of mounting of the tires should be indicated thereon. Also, the magnitude of the pseudocamber may be indicated. In such case, it is possible to pair on one axle two tires having pseudocambers which are of equal or approximately equal magnitude.

In special cases, depending on the design of the automotive vehicle, the pseudocamber of the tires employed on one axle may be larger than the pseudocamber of the tires employed on the other. In general, however, the magnitude of the pseudocamber need not be indicated so long as it remains below a prescribed limit.

For each vehicle model, there exists an optimum pseudocamber which most frequently is such as to give rise to a thrust of from 1 percent to 4 percent of the rated load of the tire, the thrust being measured under conditions specified below. In some cases, it is desirable that the pseudocamber give rise to a thrust below 1 percent or exceeding 4 percent of the rated load of tire, but in any case no more than 6 percent of the rated load of the tire. The precise limits depend upon the type of tire in addition to the model of the automotive vehicle. Moreover, for spare tires it is desirable to employ tires having a pseudocamber which is low or zero and having a mounting direction which is that of the front wheel tires.

Figure 3:
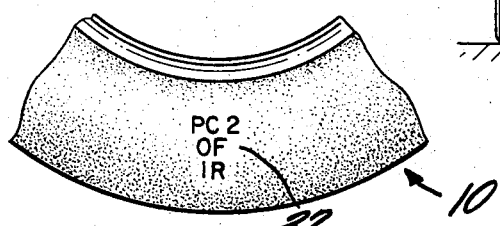
FIG. 3 is a fragmentary view in elevation, on a scale larger than that of FIG. 1, showing the formation of a portion of a tire in accordance with the invention.

FIG. 3 shows a portion of the tire 10 of FIG. 1. The sidewall of the tire is embossed with the symbol

PC2

OF

IR

This is one of an infinite number of possible arbitrary symbols suitable for indicating to mechanics or users how the tire should be mounted. The symbol "PC2" indicates that the pseudocamber gives rise to a lateral thrust equal to 2 percent of the rated load of the tire. The symbol "OF" indicates that the tire should be mounted with the legend facing out if on the front of the vehicle. The symbol "IR" indicates that the tire should be mounted with the legend facing in if on the rear of the vehicle. These symbols constitute a legend 32 which can optionally be made highly detailed or highly elliptical.

Actually, the number 2 formed on one of the sidewalls of the tire is sufficient where the user of the tire understands that the number represents the magnitude of the lateral thrust developed by virtue of the pseudocamber as a function of the rated load of the tire and that the placement of the numeral on one sidewall as opposed to the other indicates that that sidewall is to face out (or in) if the tire is mounted in front and in an opposite sense if the tire is mounted in the rear. Alternatively, in cases where it is not desired to indicate the magnitude of the pseudocamber but only the direction, a colored dot or any other arbitrarily selected symbol formed on a specified sidewall is sufficient to impart the requisite information to the user.

Figure 4:
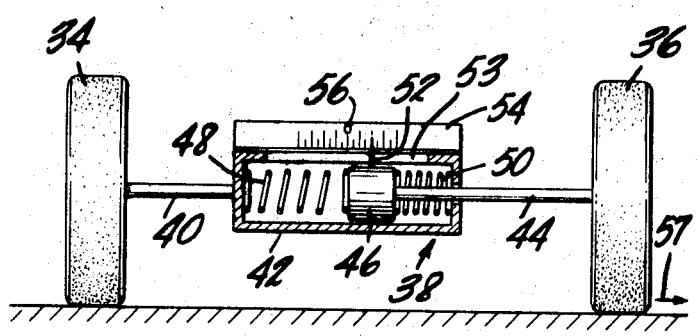
FIG. 4 is a schematic view in elevation showing a first step in the measurement of pseudocamber in accordance with the invention.
Figure 5:
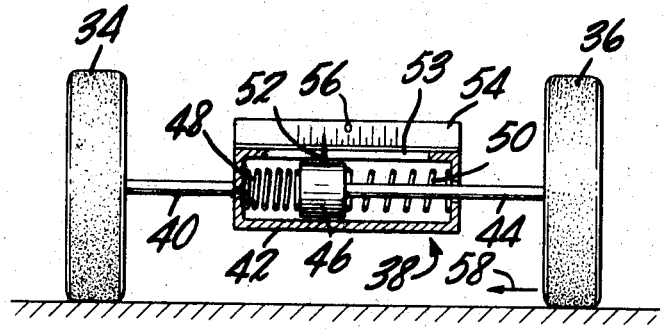
FIG. 5 is a view similar to FIG. 4 showing a second step in the method of measuring pseudocamber.
Figure 6:
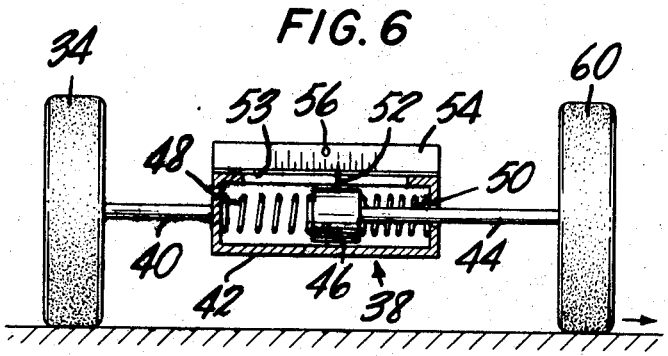
FIG. 6 is a view similar to FIGS. 4 and 5 showing a third step on the method of measuring pseudocamber.

FIGS. 4—6 illustrate a method of measuring pseudocamber. Tires 34 and 36 are mounted on a dynamometric axle 38 which may but need not be part of an automotive vehicle. This axle includes a first portion 40 rigidly connected to a cylinder 42, and a second portion 44 rigidly connected to a piston 46 movable within the cylinder 42. Calibrated springs 48 and 50 are interposed between the ends of the cylinder 42 and opposite sides of the piston 46.

A needle 52 integral with the piston 46 projects outwardly of the cylinder through a slot 53 therein, and moves along a graduated scale 54 having a zero point 56 in the middle thereof.

The dynamometric axle 38 is caused to move freely on level ground at a predetermined speed, for instance 10 km./h. The movement of tires 34 and 36 causes the axle 38 to be extended or compressed and the needle 52 shows on the scale the magnitude of the combined pseudocambers of tires 34 and 36.

Initially, a search is made to find a tire of a series having zero or substantially zero pseudocamber. In FIG. 4, the needle 52 is displaced to the right, indicating the polarity and magnitude of the resultant thrust. In FIG. 5, the tire 36 has been mounted in an opposite sense, so that the contribution of that tire to the readings obtained in FIGS. 4 and 5 cancels out, as shown by the arrows 57 (FIG. 4) and 58 (FIG. 5). If the average of the two readings is zero, it is known that the tire 34 has zero pseudocamber. If the average of the two readings is not zero, the test is repeated with another tire replacing the tire 34 until two readings with the tire 36 mounted first in one sense and then in the other average out to zero lateral thrust. Such result indicates that the tire paired with the tire 36, say a tire 34, has zero pseudocamber.

Thereafter, the remaining tires of the series can be graded very easily as shown in FIG. 6. Since the tire 34 is known to have zero pseudocamber, any lateral thrust developed by a succeeding test tire such as the test tire 60 is due to the pseudocamber of the tire, and the tire, when tested, can be marked with an appropriate legend, such as the one illustrated in FIG. 3.

The force measured (or recorded) by the dynamometer is of course equal to one-half the pseudocamber of the tire 60 since this force is balanced by equal reaction forces from the ground on the tires 34 and 60 during rolling.

All testing is of course done under standard conditions. Specifically, a speed is selected, such as 10 km./h, the dynamometer is level, and the tires are inflated and loaded identically in accordance with a predetermined standard. The conditions of the test eliminate the influence of a possible systematic error and make certain that the two tires mounted on the axle are substantially identical except possibly as regards their pseudocamber.

Thus there is provided in accordance with the invention a novel method facilitating advantageous use of tires the pseudocamber of which is such that, heretofore, the tires would be commercially undesirable. In accordance with the invention, such tires are not rejected and can even serve to improve the straight-line stability of an automotive vehicle.

Many modifications of the representative embodiments described herein will readily occur to those skilled in the art. Clearly, the invention does not depend upon the terminology that may be used in order to designate the pseudocamber or any other phenomenon that may be related to it. Further, the optimum pseudocamber and the positioning of the tires on the vehicle are independent of the means by which the pseudocamber has been obtained. Moreover, many means and machines may be used to manufacture the tires and determine the pseudocamber. Accordingly, the invention is to be construed as including all of the modifications thereof within the scope of the appended claims.

I claim:

1. A tire casing having a pseudocamber that is at least in part aleatory, said pseudocamber having a magnitude producing a force on the wheel on which said tire is mounted when said tire proceeds at a rolling speed of 10 km./h, at rated load and pressure, and on level ground within the range of 0 percent to 6 percent of the rated load of the tire, said tire casing being further formed with indicating means resulting from testing said aleatory pseudocamber and indicating the direction of mounting of the tire on the rim of said wheel, said direction of mounting being dependent on the direction of said pseudocamber.

2. A tire casing according to claim 1 in which said range is 1 percent to 4 percent.

3. A tire casing according to claim 1 in which said tire is reinforced with radial cords.

4. A method of utilization of tires having a pseudocamber on an automotive vehicle, comprising the steps of mounting said tires on their respective rims in such a manner that said pseudocamber produces forces perpendicular to the front wheels of said automotive vehicle directed outwardly on either side of the vehicle and forces perpendicular to the rear wheels of said automotive vehicle directed inwardly towards each other.